(12) United States Patent
Schimmel et al.

(10) Patent No.: US 6,197,883 B1
(45) Date of Patent: Mar. 6, 2001

(54) THERMOSETTING COATING COMPOSITIONS CONTAINING FLOW MODIFIERS PREPARED BY CONTROLLED RADICAL POLYMERIZATION

(75) Inventors: Karl F. Schimmel, Verona; Karen A. Barkac, Murrysville; Kurt A. Humbert, Allison Park; Jonathan D. Goetz, Sarver; James B. O'Dwyer, Valencia, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/325,226

(22) Filed: Jun. 3, 1999

(51) Int. Cl.$^7$ .............................. C08L 53/00; C08L 63/00; C08F 8/00
(52) U.S. Cl. .............................. 525/111; 525/88; 525/191; 525/934; 524/505; 524/904
(58) Field of Search .............................. 525/88, 111, 191, 525/934; 524/505, 904

(56) References Cited

U.S. PATENT DOCUMENTS

| | | | |
|---|---|---|---|
| 4,801,680 | 1/1989 | Geary et al. | 528/272 |
| 4,889,890 | 12/1989 | Kerr et al. | 525/113 |
| 4,937,288 | 6/1990 | Pettit, Jr. et al. | 525/176 |
| 4,997,900 | 3/1991 | Brinkman | 525/45 |
| 5,098,955 | 3/1992 | Pettit, Jr. | 525/194 |
| 5,202,382 | 4/1993 | Pettit, Jr. | 525/108 |
| 5,212,245 | 5/1993 | Franks et al. | 525/223 |
| 5,214,101 | 5/1993 | Pettit, Jr. et al. | 525/176 |
| 5,407,707 | 4/1995 | Simeone et al. | 427/410 |
| 5,439,896 | 8/1995 | Ito et al. | 525/107 |
| 5,508,337 | 4/1996 | Wamprecht et al. | 524/507 |
| 5,508,349 | 4/1996 | Clark et al. | 525/124 |
| 5,510,444 | 4/1996 | Halpaap et al. | 528/45 |
| 5,552,487 | 9/1996 | Clark et al. | 525/131 |
| 5,554,692 | 9/1996 | Ross | 525/124 |
| 5,621,059 | 4/1997 | Dupont et al. | 526/318.44 |
| 5,621,064 | 4/1997 | Laas et al. | 528/60 |
| 5,663,240 | 9/1997 | Simeone et al. | 525/327.3 |
| 5,710,214 | 1/1998 | Chou et al. | 525/124 |
| 5,763,548 | 6/1998 | Matyjaszewski et al. | 526/135 |
| 5,777,061 | 7/1998 | Yonek et al. | 528/45 |
| 5,789,487 | 8/1998 | Matyjaszewski et al. | 525/301 |
| 5,807,937 | 9/1998 | Matyjaszewski et al. | 526/135 |

FOREIGN PATENT DOCUMENTS

| | | |
|---|---|---|
| WO 96/30421 | 10/1996 | (WO) . |
| WO 97/18247 | 5/1997 | (WO) . |
| WO 97/30131 | 8/1997 | (WO) . |
| WO 98/01480 | 1/1998 | (WO) . |
| WO 98/40415 | 9/1998 | (WO) . |

OTHER PUBLICATIONS

Fox, *Bull. Amer. Physics Soc.*, 1,3 p. 123 (1956).

*Primary Examiner*—Tae Yoon
(74) *Attorney, Agent, or Firm*—Williams J. Uhl

(57) ABSTRACT

Thermosetting coating compositions, e.g., powder coating compositions, are provided and comprise: (a) a first reactant having functional groups, e.g., an epoxide functional (meth) acrylic polymer; (b) a second reactant having functional groups that are co-reactive with the functional groups of the first reactant, e.g., a carboxylic acid functional crosslinking agent; and (c) a polymeric flow control agent. The flow control agent is a block copolymer prepared by controlled radical polymerization and comprises: (i) a first block containing residues of at least one first ethylenically unsaturated radically polymerizable monomer that is free of hydroxy functionality; and (ii) a second block containing residues of at least one second ethylenically unsaturated radically polymerizable monomer that is free of hydroxy functionality. The second monomer of the flow control agent has a calculated Tg of at least 20° C. greater than that of the first monomer. The first and second blocks of the flow control agent may each independently contain a minor amount of hydroxy functional monomer residues.

38 Claims, No Drawings

THERMOSETTING COATING COMPOSITIONS CONTAINING FLOW MODIFIERS PREPARED BY CONTROLLED RADICAL POLYMERIZATION

FIELD OF THE INVENTION

The present invention relates to thermosetting coating compositions containing flow control agents. Particularly, the invention relates to such compositions containing flow control agents that are prepared by controlled radical polymerization and which comprise at least two blocks, a first block containing residues of a first monomer, and a second block containing residues of a second monomer. More particularly, the second monomer of the flow control agent of the composition of the present invention has a calculated glass transition temperature (Tg) of at least 20° C. greater than that of the first monomer.

BACKGROUND OF THE INVENTION

Coating compositions, e.g., liquid and powder coating compositions, are used in a wide variety of applications, including, for example, the automotive, appliance and industrial markets. Coatings are often used to provide decorative qualities and/or corrosion protection to the substrates over which they are applied. Correspondingly, applied coatings are typically required to have at least a continuous defect free surface, and in the case of decorative finishes, also a very smooth surface. The automotive industry has particularly strict requirements as to the smoothness of the coatings that are used, as is the case with automotive clear top-coat compositions.

Coating compositions typically contain a flow control agent (also referred to as a flow modifier) to improve the appearance of the cured coating. Flow control agents have surface active properties and are thought to improve the appearance of a cured coating by altering the flow and leveling of the applied coating during its cure cycle. Flow control agents containing functional groups, e.g., carboxylic acid groups and/or hydroxyl groups, are known, and in addition to enhancing appearance, can also improve the adhesion of the coating to the substrate over which it is applied, and/or improve the adhesion or compatibility of a subsequently applied coating.

Coating compositions are typically required to provide optimum properties, e.g., appearance and/or corrosion resistance, at a minimum film thickness. For example, in the automotive industry, clear top-coats are typically required to have cured film thicknesses of no greater than 50 microns (2 mils). Advantages associated with coatings applied at lower film thickness include, for example, reduced material costs and weight gain of the coated ware, which is particularly desirable in the aircraft industry. However, as the film build of an applied coating composition is decreased, the appearance of the resulting cured coating typically diminishes, for example, as evidenced by lower measured gloss values.

In addition to the application of coatings at lower film builds, investigation and development in recent years has been directed towards reducing the environmental impact of coatings compositions, in particular that associated with emissions into the air of volatile organics during their use. Accordingly, interest in coatings having lower volatile organic content (VOC), e.g., powder coatings and high solids coatings, has been increasing. Powder coating compositions are free flowing particulate compositions that are substantially free of solvents. The appearance of powder coatings typically degrades rather precipitously with decreasing film thickness, e.g., at film thicknesses less than 75 microns (3 mils), and in particular at film thicknesses less than 50 microns (2 mils). In the absence of solvents that can enhance the flow and leveling of an applied coating, a flow control agent is a critical component in the majority of powder coating compositions.

It would be desirable to develop coating compositions, e.g., powder coating compositions, that have improved properties, such as appearance. In particular, it would be desirable to develop coating compositions that have improved properties, such as appearance, at lower film thicknesses, e.g., film thicknesses less than or equal to 50 microns.

U.S. Pat. No. 5,212,245 describes thermosetting powder coating compositions comprising a curable particulate resinous material and a flow control agent. The flow control agent of the '245 patent is described as a copolymer of an alkyl acrylate and/or alkyl methacrylate containing from 6 to 20 carbon atoms in the alkyl group, and a hydroxyalkyl acrylate and/or hydroxyalkyl methacrylate. The flow control agents of the '245 patent are not described as being either block copolymers or prepared by controlled or living radical polymerization methods.

International Patent Publication No. WO 97/30131 describes curable coating compositions comprising either a liquid or particulate curable film-forming resinous material and a flow control agent. The flow control agent of Publication No. WO 97/30131 is described as being a copolymer of at least one alkyl acrylate and/or alkyl methacrylate containing from 1 to 20 carbon atoms in the alkyl group, an amino functional acrylate and/or amino functional methacrylate, and optionally a hydroxyalkyl acrylate and/or hydroxyalkyl methacrylate. The flow control agents of Publication No. WO 97/30131 are described as being prepared by non-living free radical polymerization methods.

U.S. Pat. Nos. 5,807,937, 5,789,487 and 5,763,548, and International Patent Publication No.'s WO 98/40415, WO 98/01480, WO 97/18247 and WO 96/30421 describe a radical polymerization process referred to as atom transfer radical polymerization (ATRP). The ATRP process is described as being a living radical polymerization that results in the formation of (co)polymers having predictable molecular weight and molecular weight distribution. The ATRP process is also described as providing highly uniform products having controlled structure (i.e., controllable topology, composition, etc.). The '937 patent also describes (co)polymers prepared by ATRP, which are useful in a wide variety of applications including, for example, with paints and coatings.

SUMMARY OF THE INVENTION

In accordance with the present invention, there is provided a thermosetting composition comprising:
(a) a first reactant having functional groups;
(b) a second reactant having functional groups that are co-reactive with the functional groups of said first reactant; and
(c) a polymeric flow control agent prepared by controlled radical polymerization, e.g., living radical polymerization, and comprising,
  (i) a first block containing residues of at least one first ethylenically unsaturated radically polymerizable monomer that is free of hydroxy functionality;
  (ii) a second block containing residues of at least one second ethylenically unsaturated radically polymerizable monomer that is free of hydroxy functionality;

wherein said second monomer has a calculated Tg of at least 20° C. greater than the calculated Tg of said first monomer.

Other than in the operating examples, or where otherwise indicated, all numbers expressing quantities of ingredients, reaction conditions, and so forth used in the specification and claims are to be understood as modified in all instances by the term "about."

DETAILED DESCRIPTION OF THE INVENTION

The polymeric flow control agent of the thermosetting compositions of the present invention contains at least two blocks, i.e., at least the first and second blocks as described above, in which each block has properties, e.g., calculated Tg, or monomer residue compositions that are distinct from those of its adjacent block(s). As the flow control agent of the present invention is prepared by controlled radical polymerization, a block of monomer residues and its architecture is also defined by the composition of the monomer feed(s) used to prepare that block.

The term "controlled radical polymerization," as used herein and in the claims, refers to those methods of radical polymerization conducted in the presence of an initiator having a radically transferable group, e.g., a halogen, and a catalyst comprising a transition metal, which is capable of changing reversibly between lower and higher oxidation states during the polymerization, e.g., Cu(I) and Cu(I) or Cu(I) and Cu(II). Controlled radical polymerizations provide control over the molecular weight, polymer chain architecture and polydispersity of the resulting polymer, e.g., as is the case with ATRP. The number of polymer chains formed during a controlled radical polymerization is often nearly equal to the number of initiators present at the beginning of the reaction, and each polymer chain typically contains a residue of the initiator.

The polymer chain architecture of a polymer refers to the position of different monomer residues within the polymer chain or a segment of the polymer chain, e.g., random, gradient, alternating or block polymer chain architectures. When more than one monomer species are used to prepare a block of the flow control agent of the present invention, e.g., the first block, the residues of those monomer species may be present in a random fashion, a gradient fashion, an alternating fashion and/or as blocks of monomer residues within, for example, the first block. The flow control agent may contain, for example, 2, 3, 4, 5 or more blocks. Typically, the flow control agent of the present invention contains 2 or 3 blocks.

When the polymeric flow control agent of the present invention contains more than two blocks, the first and second blocks may be adjacent to each other or separated by one or more additional blocks. The first and second blocks may be present in the polymeric flow control agent in any order, e.g., either of the first or second blocks may occur first relative to that portion of the flow control agent containing a residue of the polymerization initiator, i.e., the tail.

The gross polymer architecture of the flow control agent of the present invention is selected from linear polymers, branched polymers, hyperbranched polymers, star polymers, graft polymers and mixtures thereof. Typically, the gross polymer architecture of the flow control agent of the present invention is selected from linear, branched and star polymers, more typically it is that of a linear polymer.

The first block of the polymeric flow control agent of the present invention is typically present in an amount of at least 5 percent by weight, preferably at least 10 percent by weight, and more preferably at least 15 percent by weight, based on total weight of the flow control agent. The first block is also typically present in an amount of less than 95 percent by weight, preferably less than 90 percent by weight, and more preferably less than 85 percent by weight, based on the total weight of the flow control agent. The first block is present in the polymeric flow control agent of the present invention in an amount ranging between any combination of these values, inclusive of the recited values.

The second block of the polymeric flow control agent of the present invention is typically present in an amount of at least 5 percent by weight, preferably at least 10 percent by weight, and more preferably at least 15 percent by weight, based on total weight of the flow control agent. The second block is also typically present in an amount of less than 95 percent by weight, preferably less than 90 percent by weight, and more preferably less than 85 percent by weight, based on the total weight of the flow control agent. The second block is present in the polymeric flow control agent of the present invention in an amount ranging between any combination of these values, inclusive of the recited values.

The weight ratio of the first block to the second block of the polymeric flow control agent of the present invention is typically from 0.05:1 to 19:1, e.g., from 0.1:1 to 9:1 or from 0.2:1 to 6:1. The polymeric flow control agent of the present invention typically has a number average molecular weight of from 500 to 100,000, e.g., from 1000 to 50,000 or from 5000 to 30,000. As used herein and in the claims, unless otherwise noted, values of number average molecular weight (Mn), weight average molecular weight (Mw) and z average molecular weight (Mz) are determined from gel permeation chromatography using polystyrene standards. Accordingly, values of Mn, Mw and Mz as presented herein do not represent absolute values, but rather averaged values relative to a set of polystyrene standards.

As used herein and in the claims, "calculated Tg" is determined in accordance with the method as described by Fox, in *Bull. Amer. Physics. Soc.*, 1,3 page 123 (1956). The calculated Tg of the second monomer of the polymeric flow control agent of the present invention, is typically at least 20° C. greater, preferably at least 30° C. greater, and more preferably at least 40° C. greater than the calculated Tg of the first monomer. Typically, the calculated Tg of the second monomer is also less than 235° C. greater than the calculated Tg of the first monomer, e.g., less than 150° C. or 100° C. greater than the calculated Tg of the first monomer. The difference in calculated Tg between the second and first monomers of the flow control agent of the present invention (i.e., the calculated Tg of the second monomer minus the calculated Tg of the first monomer) may range between any combination of these values, inclusive of the recited values.

The first and second monomers of the flow control agent of the composition of the present invention may each be selected independently from vinyl monomers, allylic monomers, olefins and mixtures thereof. Classes of vinyl monomers from which each of the first and second monomers may be independently selected include, but are not limited to, (meth)acrylates, vinyl aromatic monomers, vinyl halides and vinyl esters of carboxylic acids. As used herein and in the claims, by "(meth)acrylate" and like terms is meant methacrylates, acrylates and mixtures of methacrylates and acrylates. Preferably, the first and second monomers are each independently selected from at least one of alkyl (meth)acrylates having from 1 to 20 carbon atoms in the alkyl group.

Specific examples of alkyl (meth)acrylates having from 1 to 20 carbon atoms in the alkyl group from which each of the first and second monomers may be independently selected include, but are not limited to, methyl (meth)acrylate, ethyl (meth)acrylate, propyl (meth)acrylate, isopropyl (meth)acrylate, n-butyl (meth)acrylate, iso-butyl (meth)acrylate, tert-butyl (meth)acrylate, 2-ethylhexyl (meth)acrylate, lauryl (meth)acrylate, isobornyl (meth)acrylate, cyclohexyl (meth)acrylate and 3,3,5-trimethylcyclohexyl (meth)acrylate. Examples of monomers having more than one (meth)acryloyl group, from which each of the first and second monomers may be independently selected, include, but are not limited to (meth)acrylic anhydride, diethyleneglycol bis(meth)acrylate, 4,4'-isopropylidenediphenol bis(meth)acrylate (Bisphenol A di(meth)acrylate), alkoxylated 4,4'-isopropylidenediphenol bis(meth)acrylate, trimethylolpropane tris(meth)acrylate and alkoxylated trimethylolpropane tris(meth)acrylate.

Specific examples of vinyl aromatic monomers from which each of the first and second monomers may be selected include, but are not limited to, styrene, p-chloromethylstyrene, divinyl benzene, vinyl naphthalene and divinyl naphthalene. Vinyl halides from which each of the first and second monomers may be independently selected include, but are not limited to, vinyl chloride and vinylidene fluoride. vinyl esters of carboxylic acids from which each of the first and second monomers may be independently selected include, but are not limited to, vinyl acetate, vinyl butyrate, vinyl 3,4-dimethoxybenzoate and vinyl benzoate.

As used herein and in the claims, by "olefin" and like terms is meant unsaturated aliphatic hydrocarbons having one or more double bonds, such as obtained by cracking petroleum fractions. Specific examples of olefins from which each of the first and second monomers may be independently selected include, but are not limited to, propylene, 1-butene, 1,3-butadiene, isobutylene and diisobutylene.

As used herein and in the claims, by "allylic monomer(s)" is meant monomers containing substituted and/or unsubstituted allylic functionality, i.e., one or more radicals represented by the following general formula I,

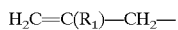

$$H_2C=C(R_1)-CH_2-$$  I wherein $R_1$ is hydrogen, halogen or a $C_1$ to $C_4$ alkyl group. Most commonly, $R_1$ is hydrogen or methyl and consequently general formula I represents the unsubstituted (meth)allyl radical. Examples of allylic monomers from which each of the first and second monomers may be independently selected include, but are not limited to: (meth)allyl ethers, such as methyl (meth)allyl ether; allyl esters of carboxylic acids, such as (meth)allyl acetate, (meth)allyl butyrate, (meth)allyl 3,4-dimethoxybenzoate and (meth)allyl benzoate.

Other ethylenically unsaturated radically polymerizable monomers from which each of the first and second monomers may be independently selected include, but are not limited to: cyclic anhydrides, e.g., maleic anhydride, 1-cyclopentene-1,2-dicarboxylic anhydride and itaconic anhydride; esters of acids that are unsaturated but do not have α,β-ethylenic unsaturation, e.g., methyl ester of undecylenic acid; and diesters of ethylenically unsaturated dibasic acids, e.g., diethyl maleate.

In a preferred embodiment of the present invention, the first monomer of the polymeric flow control agent is selected from the group consisting of iso-decyl (meth)acrylate, lauryl (meth)acrylate, n-octyl (meth)acrylate, 2-ethylhexyl (meth)acrylate, n-butyl acrylate, iso-butyl acrylate, ethyl acrylate and mixtures thereof. In a particularly preferred embodiment of the present invention, the first monomer is 2-ethylhexyl (meth)acrylate.

In a preferred embodiment of the present invention, the second monomer of the polymeric flow control agent is selected from the group consisting of isobornyl (meth)acrylate, n-butyl methacrylate, iso-butyl methacrylate, ethyl methacrylate and mixtures thereof. In a particularly preferred embodiment of the present invention, the second monomer is iso-butyl methacrylate.

The first and second blocks of the polymeric flow control agent of the present invention may each independently contain residues of a minor amount of at least one hydroxy functional ethylenically unsaturated monomer, in addition to the residues of the respective first and second monomers. If present in both the first and second blocks, the residue(s) of the hydroxy functional monomer may be the same or different. As used herein and in the claims, by "hydroxy functional ethylenically unsaturated monomer" is meant to include monomers having hydroxy functionality, e.g., hydroxyalkyl (meth)acrylates, and monomers that can be converted to hydroxy functional residues (i.e., precursors of hydroxy functional monomer residues), examples of which include, vinyl esters of carboxylic acids, such as vinyl acetate, and epoxide functional monomers, such as glycidyl (meth)acrylate.

Residues of hydroxy functional ethylenically unsaturated monomers may independently occupy any position within either or both of the first and second blocks of the flow control agent of the present invention. The hydroxy functional monomer residues may be present in either or both of the first and second blocks in a random fashion; a gradient fashion; or as one or more blocks of hydroxy functional monomers occupying any position throughout the whole of either or both of the first and second blocks, e.g., at the beginning, middle and/or end of the first block. In the case when the first and second blocks are adjacent to one another and each further contains an adjacent block of hydroxy functional monomer residues, the first and second blocks are defined by the monomer feeds used in their preparation, as discussed previously herein.

When the polymeric flow control agent of the present invention contains residues of hydroxy functional ethylenically unsaturated radically polymerizable monomer, the hydroxy monomer residues may be present in the first and/or second blocks in an amount of at least 1 percent by weight, preferably at least 2 percent by weight, and more preferably at least 3 percent by weight, based on the total weight of the respective first and second blocks. Residues of the hydroxy functional ethylenically unsaturated radically polymerizable monomer may also be present in the first and/or second blocks of the polymeric flow control agent in an amount of less than 20 percent by weight, preferably less than 15 percent by weight, and more preferably less than 10 percent by weight, based on the total weight of the respective first and second blocks. The amount of residues of hydroxy functional monomer that may be present in each of the first and second blocks may range independently between any combination of these values, inclusive of the recited values.

In an embodiment of the present invention the hydroxy functional ethylenically unsaturated monomer is selected from hydroxyalkyl (meth)acrylates having from 2 to 20 carbon atoms in the alkyl group; epoxide functional ethylenically unsaturated radically polymerizable monomers, which are hydrolyzed either prior to or after polymerization; hydroxyalkyl (meth)acrylates having from 2 to 20 carbon atoms in the alkyl group, which are reacted with one or more lactones either prior to or after polymerization; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof. As used herein and in the claims, the term "saturated" as in "saturated monocarboxylic acid" is intended to denote the absence of ethylenic unsaturation but is not intended to exclude aromatic unsaturation as found, for example, in a benzene ring. A preferred saturated monocarboxylic acid is isostearic acid, and a preferred glycidyl ester of a saturated monocarboxylic acid is available commercially from Shell Chemical Company as CARDURA E glycidyl ester.

In a preferred embodiment of the present invention, the hydroxyalkyl (meth)acrylate is selected from hydroxyethyl (meth)acrylate, hydroxypropyl (meth)acrylate, hydroxybutyl (meth)acrylate and mixtures thereof; the epoxide functional monomer is selected from the group consisting of glycidyl (meth)acrylate, 3,4-epoxycyclohexylmethyl (meth) acrylate, 2-(3,4-epoxycyclohexyl)ethyl (meth)acrylate, allyl glycidyl ether and combinations thereof; the lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and the beta-hydroxy ester functional (meth)acrylate is the reaction product of glycidyl (meth)acrylate and isostearic acid. In a particularly preferred embodiment of the present invention, the hydroxy functional monomer is hydroxypropyl (meth)acrylate.

The polymeric flow control agent of the present invention may optionally have a block containing residues of at least one amine functional ethylenically unsaturated radically polymerizable monomer. The amine functional monomer may have amine functionality selected from primary amine ($-NH_2$), secondary amine ($-N(R_2)H$), tertiary amine ($-N(R_2)(R_3)$) and combinations thereof, wherein $R_2$ and $R_3$ are each independently selected from $C_1-C_{20}$ linear or branched alkyl, $C_5-C_8$ cyclic alkyl, aromatic groups and polycyclic aromatic groups. Typically, $R_2$ and $R_3$ are each selected independently from $C_1-C_{20}$ linear or branched alkyl, e.g., $C_1-C_4$ alkyl.

The amine functional ethylenically unsaturated radically polymerizable monomer may be selected from aminoalkyl (meth)acrylates having from 2 to 20 carbon atoms in the alkyl group. Preferably, the amine group of the amine functional monomer is a tertiary amine, and the amine functional monomer is selected from di($C_1-C_4$)aminoalkyl (meth)acrylates, e.g., di($C_1-C_4$)aminoethyl (meth)acrylates. In a preferred embodiment of the present invention, the amine functional monomer is dimethylaminoethyl (meth) acrylate.

The block containing residues of amine functional ethylenically unsaturated radically polymerizable monomer may optionally contain a minor amount of residues of at least one hydroxy functional ethylenically unsaturated monomer. The hydroxy functional monomer may be selected from one or more of those hydroxy functional monomers or hydroxy functional monomer precursors as recited and described previously herein. The hydroxy functional monomer may be present in the block containing residues of amine functional monomer in an amount ranging between any combination of those values as recited previously herein with respect to the first and second blocks, inclusive of the recited values. The hydroxy functional monomer residues may occupy any position in the block containing amine functional monomer residues, as discussed previously herein with respect to the first and second blocks.

When the polymeric flow control agent of the present invention has a block containing residues of amine functional monomer, the block containing residues of amine functional monomer is present in an amount of at least 1 percent by weight, preferably at least 5 percent by weight, and more preferably at least 10 percent by weight, based on the total weight of the polymeric flow control agent. The block containing residues of amine functional monomer may also be present in an amount of less than 35 percent by weight, preferably less than 28 percent by weight, and more preferably less than 20 percent by weight, based on the total weight of the polymeric flow control agent. The block containing residues of amine functional monomer may be present in the polymeric flow control agent of the present invention in an amount ranging between any combination of these values, inclusive of the recited values.

Residue(s) of the amine functional monomer can be present in either the first or second blocks, or alternatively may be present in a separate block of the polymeric flow control agent of the present invention. Preferably, the block containing residues of at least one amine functional monomer and optionally a minor amount of residues of at least one hydroxy functional monomer is present as a block separate from the first and second blocks, e.g., being present as a third block, in which case the first and second blocks are free of residues of amine functional monomers.

The amine functional monomer residues are typically present in the block containing amine functional monomer residues in an amount of at least 50 percent by weight, preferably at least 70 percent by weight, and more preferably at least 80 percent by weight, based on the total weight of monomer residues in the block that are other than hydroxy functional monomer residues. In a particularly preferred embodiment of the present invention, the amine functional monomer residues comprise 100 percent by weight of those monomer residues that are other than hydroxy functional monomer residues in the block containing amine functional monomer residues.

The polymeric flow control agent is typically present in the thermosetting coating composition of the present invention in an amount of at least 0.01 percent by weight, preferably at least 0.1 percent by weight, and more preferably at least 0.2 percent by weight, based on the total resin solids weight of the composition of the present invention. The polymeric flow control agent is also present in the composition of the present invention in an amount typically less 5 percent by weight, preferably less than 4 percent by weight, and more preferably less than 3 percent by weight, based on the total resin solids weight of the composition of the present invention. The amount of polymeric flow control agent present in the thermosetting coating composition of the present invention may range between any combination of the these values, inclusive of the recited values.

In a preferred embodiment of the present invention, the controlled radical polymerization method used to prepare the flow control agent is atom transfer radical polymerization (ATRP). The ATRP method is described as a "living polymerization," i.e., a chain-growth polymerization that propagates with essentially no chain transfer and essentially no chain termination. The molecular weight of a polymer prepared by ATRP can be controlled by the stoichiometry of the reactants, i.e., the initial concentration of monomer(s) and initiator(s). In addition, ATRP also provides polymers having characteristics including, for example, narrow molecular weight distributions, e.g., polydispersity index values (PDI) less than 2.5, and well defined polymer chain structure, e.g., block copolymers and alternating copolymers.

The ATRP process can be described generally as comprising: polymerizing one or more radically polymerizable monomers in the presence of an initiation system; forming a polymer; and isolating the formed polymer. The initiation system comprises: an initiator having a radically transferable atom or group; a transition metal compound, i.e., a catalyst, which participates in a reversible redox cycle with the initiator; and a ligand, which coordinates with the transition metal compound. The ATRP process is described in further detail in U.S. Pat. Nos. 5,807,937, 5,789,487 and 5,763,548.

In preparing the flow control agent of the present invention by ATRP, the initiator may be selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable group, which is typically a halo group. The initiator may also be substituted with functional groups, e.g., oxyranyl groups, such as glycidyl groups. Additional useful initiators and the various radically transferable groups that may be associated with them (e.g., cyano, cyanato, thiocyanato and azido groups) are described in U.S. Pat. No. 5,807,937 at column 17, line 4 through column 18, line 28.

Polymeric compounds (including oligomeric compounds) having radically transferable groups may be used as ATRP initiators, and are herein referred to as "macroinitiators." Examples of macroinitiators include, but are not limited to, polystyrene prepared by cationic polymerization and having a terminal halide, e.g., chloride, and a polymer of 2-(2-bromopropionoxy) ethyl acrylate and one or more alkyl (meth)acrylates, e.g., butyl acrylate, prepared by conventional non-living radical polymerization. Macroinitiators can be used in the ATRP process to prepare graft polymers, such as grafted block copolymers and comb copolymers. A further discussion of macroinitiators is found in U.S. Pat. No. 5,789,487 at column 13, line 27 through column 18, line 58.

Preferably, the ATRP initiator may be selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl) benzene, diethyl-2-halo-2-methyl malonate and mixtures thereof. Particularly preferred ATRP initiators are diethyl-2-bromo-2-methyl malonate and p-toluenesulfonyl chloride.

Catalysts that may be used in the ATRP preparation of the polymeric flow control agents of the present invention, include any transition metal compound that can participate in a redox cycle with the initiator and the growing polymer chain. It is preferred that the transition metal compound not form direct carbon-metal bonds with the polymer chain. Transition metal catalysts useful in the present invention may be represented by the following general formula II, $$TM^{n+}X_n \qquad \qquad II$$

wherein TM is the transition metal, n is the formal charge on the transition metal having a value of from 0 to 7, and X is a counterion or covalently bonded component. Examples of the transition metal (TM) include, but are not limited to, Cu, Fe, Au, Ag, Hg, Pd, Pt, Co, Mn, Ru, Mo, Nb and Zn.

Examples of X include, but are not limited to, halogen, hydroxy, oxygen, $C_1$–$C_6$-alkoxy, cyano, cyanato, thiocyanato and azido. A preferred transition metal is Cu(I) and X is preferably halogen, e.g., chloride. Accordingly, a preferred class of transition metal catalysts are the copper halides, e.g., Cu(I)Cl. It is also preferred that the transition metal catalyst contain a small amount, e.g., 1 mole percent, of a redox conjugate, for example, $Cu(II)Cl_2$ when Cu(I)Cl is used. Additional catalysts useful in preparing the polymeric flow control agents of the present invention are described in U.S. Pat. No. 5,807,937 at column 18, lines 29 through 56. Redox conjugates are described in further detail in U.S. Pat. No. 5,807,937 at column 11, line 1 through column 13, line 38.

Ligands that may be used in the ATRP preparation of the polymeric flow control agent of the present invention, include, but are not limited to compounds having one or more nitrogen, oxygen, phosphorus and/or sulfur atoms, which can coordinate to the transition metal catalyst compound, e.g., through sigma and/or pi bonds. Classes of useful ligands, include but are not limited to: unsubstituted and substituted pyridines and bipyridines; porphyrins; cryptands; crown ethers; e.g., 18-crown-6; polyamines, e.g., ethylenediamine; glycols, e.g., alkylene glycols, such as ethylene glycol; carbon monoxide; and coordinating monomers, e.g., styrene, acrylonitrile and hydroxyalkyl (meth)acrylates. A preferred class of ligands are the substituted bipyridines, e.g., 4,4'-dialkyl-bipyridyls. Additional ligands that may be used in preparing polymeric flow control agent of the present invention are described in U.S. Pat. No. 5,807,937 at column 18, line 57 through column 21, line 43.

In the ATRP preparation the polymeric flow control agent of the present invention, the amounts and relative proportions of initiator, transition metal compound and ligand are those for which ATRP is most effectively performed. The amount of initiator used can vary widely and is typically present in the reaction medium in a concentration of from $10^{-4}$ moles/liter (M) to 3 M, for example, from $10^{-3}$ M to $10^{-1}$ M. As the molecular weight of the polymeric flow control agent can be directly related to the relative concentrations of initiator and monomer(s), the molar ratio of initiator to monomer is an important factor in polymer preparation. The molar ratio of initiator to monomer is typically within the range of $10^{-4}$:1 to 0.5:1, for example, $10^{-3}$:1 to $5 \times 10^{-2}$:1.

In preparing the polymeric flow control agent of the present invention, the molar ratio of transition metal compound to initiator is typically in the range of $10^{-4}$:1 to 10:1, for example, 0.1:1 to 5:1. The molar ratio of ligand to transition metal compound is typically within the range of 0.1:1 to 100:1, for example, 0.2:1 to 10:1.

Polymeric flow control agents useful in the thermosetting compositions of the present invention may be prepared in the absence of solvent, i.e., by means of a bulk polymerization process. Generally, the polymeric flow control agent is prepared in the presence of a solvent, typically water and/or an organic solvent. Classes of useful organic solvents include, but are not limited to, esters of carboxylic acids, ethers, cyclic ethers, $C_5$–$C_{10}$ alkanes, $C_5$–$C_8$ cycloalkanes, aromatic hydrocarbon solvents, halogenated hydrocarbon solvents, amides, nitrites, sulfoxides, sulfones and mixtures thereof. Supercritical solvents, such as $CO_2$, $C_1$–$C_4$ alkanes and fluorocarbons, may also be employed. A preferred class of solvents are the aromatic hydrocarbon solvents, particularly preferred examples of which are xylene, and mixed aromatic solvents such as those commercially available from Exxon Chemical America under the trademark SOLVESSO.

Additional solvents are described in further detail in U.S. Pat. No. 5,807,937 at column 21, line 44 through column 22, line 54.

The ATRP preparation of the polymeric flow control agent typically conducted at a reaction temperature within the range of 25° C. to 140° C., e.g., from 50° C. to 100° C., and a pressure within the range of 1 to 100 atmospheres, usually at ambient pressure. The atom transfer radical polymerization is typically completed in less than 24 hours, e.g., between 1 and 8 hours.

When the polymeric flow control agent is prepared by ATRP in the presence of a solvent, the solvent is typically removed after the polymer has been formed, by appropriate means as are known to those of ordinary skill in the art, e.g., vacuum distillation. Alternatively, the polymer may be precipitated out of the solvent, filtered, washed and dried according to known methods. After removal of, or separation from, the solvent, the polymeric flow control agent typically has a solids (as measured by placing a 1 gram sample in a 110° C. oven for 60 minutes) of at least 95 percent, and preferably at least 98 percent, by weight based on total polymer weight.

Prior to use in the thermosetting compositions of the present invention, the ATRP transition metal catalyst and its associated ligand are typically separated or removed from the polymeric flow control agent. Removal of the ATRP catalyst is achieved using known methods, including, for example, adding a catalyst binding agent to the a mixture of the polymer, solvent and catalyst, followed by filtering. Examples of suitable catalyst binding agents include, for example, alumina, silica, clay or a combination thereof. A mixture of the polymer, solvent and ATRP catalyst may be passed through a bed of catalyst binding agent. Alternatively, the ATRP catalyst may be oxidized in situ, the oxidized residue of the catalyst being retained in the polymeric flow control agent.

The polymeric flow control agent may be selected from the group consisting of linear polymers, branched polymers, hyperbranched polymers, star polymers, graft polymers and mixtures thereof. The form, or gross architecture, of the polymer can be controlled by the choice of initiator and monomers used in its preparation. Linear polymeric flow control agents may be prepared by using initiators having one or two radically transferable groups, e.g., diethyl-2-halo-2-methyl malonate and $\alpha,\alpha'$-dichloroxylene in the case of preparation by ATRP. Branched polymeric flow control agents may be prepared by using branching monomers, i.e., monomers containing radically transferable groups or more than one ethylenically unsaturated radically polymerizable group, e.g., 2-(2-bromopropionoxy)ethyl acrylate, p-chloromethylstyrene and diethyleneglycol bis (methacrylate) in the case of preparation by ATRP. Hyperbranched polymeric flow control agents may be prepared by increasing the amount of branching monomer used.

Star polymeric flow control agents may be prepared using initiators having three or more radically transferable groups, e.g., hexakis(bromomethyl)benzene in the case of preparation by ATRP. Polymeric flow control agents in the form of graft polymers may be prepared using a macroinitiator, as previously described herein. Graft, branched, hyperbranched and star polymers are described in further detail in U.S. Pat. No. 5,807,937 at column 31, line 40 through column 38, line 55.

Gradient copolymers can be prepared from two or more monomers by ATRP methods, and are generally described as having architecture that changes gradually and in a systematic and predictable manner along the polymer backbone. Gradient copolymers can be prepared by ATRP methods by (a) varying the ratio of monomers fed to the reaction medium during the course of the polymerization, (b) using a monomer feed containing monomers having different rates of polymerization, or (c) a combination of (a) and (b). Gradient copolymers are described in further detail in U.S. Pat. No. 5,807,937 at column 29, line 29 through column 31, line 35.

The polymeric flow control agent of the present invention may be further described as containing at least one of the following representative polymer chain structures III and IV:

    III and

    IV wherein M is a residue of at least one first ethylenically unsaturated radically polymerizable monomer that is free of hydroxy functionality; G is a residue of at least one second ethylenically unsaturated radically polymerizable monomer that is free of hydroxy functionality; the second monomer having a calculated Tg of at least 30° C. greater than the calculated Tg of the first monomer; s and p represent average numbers of residues occurring in a block of residues; s and p are each independently from 2 to 100 for each structure. With polymer chain structures III and IV, each of M and G may optionally and independently be residues of a minor amount of hydroxy functional ethylenically unsaturated radically polymerizable monomer as described previously herein, e.g., hydroxypropyl (meth)acrylate, in addition to the respective first and second monomers, in which case s and p are each independently from 3 to 100 or each structure.

With reference to polymer chain structures III and IV, the first and second ethylenically unsaturated radically polymerizable monomers are the same as the first and second monomers described previously herein. In an embodiment of the present invention, one of either the first or second monomer is selected from amine functional ethylenically unsaturated radically polymerizable monomers as described previously herein, e.g., dimethylaminoethyl (meth)acrylate, and optionally a minor amount of hydroxy functional monomer, e.g., hydroxypropyl (meth)acrylate.

With further reference to general polymer chain structures III and IV, M represents one or more types of first monomer residues that are free of hydroxy functionality, and p represents the average total number of M residues occurring per block of M residues (M-block). The -$(M)_s$- portion of general structures III and IV represents (1) a homoblock of a single type of M residue, (2) an alternating block of two types of M residues, (3) a polyblock of two or more types of M residues, or (4) a gradient block of two or more types of M residues.

For purposes of illustration, when the M-block is prepared from, for example, 10 moles of 2-ethylhexyl methacrylate, the -$(M)_s$- portion of general structures III and IV represents a homoblock of 10 residues of 2-ethylhexyl methacrylate. In the case where the M-block is prepared from, for example, 5 moles of 2-ethylhexyl methacrylate and 5 moles of lauryl methacrylate, the -$(M)_s$- portion of general structures III and IV represents, depending on the conditions of preparation, as is known to one of ordinary skill in the art: (a) a diblock of 5 residues of 2-ethylhexyl methacrylate and 5 residues of lauryl methacrylate having a total of 10 residues (i.e., s=10); (b) a random block of 5 residues of 2-ethylhexyl methacrylate and 5 residues of lauryl methacrylate having a total of 10 residues; (c) an alternating block of 2-ethylhexyl methacrylate and lauryl methacrylate residues beginning with either a residue of 2-ethylhexyl methacrylate or a residue of lauryl methacrylate, and having a total of 10 residues; or (d) a gradient block of 2-ethylhexyl methacrylate and lauryl methacrylate residues beginning with either residues of 2-ethylhexyl methacrylate or residues of lauryl methacrylate, and having a total of 10 residues. Accordingly, the -(G)$_p$- portions of general structures III and IV and -(E)$_q$- portions of the following general structures may each be described in a manner similar to that of the -(M)$_s$- portions provided above.

For purposes of further illustration, when the M-block is prepared from, for example, 5 moles of a monomer $M_1$ and 5 moles of a monomer $M_2$, and the -(M)$_s$- portion of general structures III and IV is in the form of a gradient block of residues of monomers $M_1$ and $M_2$, the gradient block may be represented more specifically by the following general structure V, $$-(M_1\text{-}M_1\text{-}M_1\text{-}M_2\text{-}M_1\text{-}M_1\text{-}M_2\text{-}M_2\text{-}M_1\text{-}M_2\text{-}M_2\text{-}M_2)- \quad V$$

The polymeric flow control agent of the present invention may be additionally described as containing at least one of the following representative polymer chain structures VI–XI:

$$-(M)_s\text{-}(G)_p\text{-}(E)_q\text{-} \qquad VI$$

$$-(M)_s\text{-}(E)_q\text{-}(G)_p\text{-} \qquad VII$$

$$-(G)_p\text{-}(M)_s\text{-}(E)_q\text{-} \qquad VIII$$

$$-(G)_p\text{-}(E)_q\text{-}(M)_s\text{-} \qquad IX$$

$$-(E)_q\text{-}(M)_s\text{-}(G)_p\text{-} \qquad X$$

and $$-(E)_q\text{-}(G)_p\text{-}(M)_s\text{-} \qquad XI$$

in which E is a residue of at least one amine functional ethylenically unsaturated radically polymerizable monomer, as described previously herein; M and G are as previously described herein and are each free of residues of amine functional ethylenically unsaturated radically polymerizable monomer; q represents average numbers of residues occurring in a block of residues; and q is independently from 2 to 100 for each structure.

When the polymeric flow control agent of the composition of the present invention is prepared by atom transfer radical polymerization in the presence of an initiator having a radically transferable group, the flow control agent may be further additionally described as having at least one of the following representative polymer chain structures XII–XVII:

$$\phi\text{-}[(M)_s\text{-}(G)_p\text{-}(E)_q\text{-}T]_z \qquad XII$$

$$\phi\text{-}[(M)_s\text{-}(E)_q\text{-}(G)_p\text{-}T]_z \qquad XIII$$

$$\phi\text{-}[(G)_p\text{-}(M)_s\text{-}(E)_q\text{-}T]_z \qquad XIV$$

$$\phi\text{-}[(G)_p\text{-}(E)_q\text{-}(M)_s\text{-}T]_z \qquad XV$$

$$\phi\text{-}[(E)_q\text{-}(M)_s\text{-}(G)_p\text{-}T]_z \qquad XVI$$

and $$\phi\text{-}[(E)_q\text{-}(G)_p\text{-}(M)_s\text{-}T]_z \qquad XVII$$

in which M, G and E are as described previously herein; φ is or is derived from the residue of said initiator free of said radically transferable group; T is or is derived from said radically transferable group of said initiator; z is at least equal to the number of radically transferable groups of the initiator and is independently for each structure at least 1, e.g., from 1 to 100 or from 1 to 5. In a preferred embodiment of the present invention, z of polymer chain structures XII–XVII is 1.

With reference to polymer chain structures XII–XVII, each of M, G and E are optionally and independently also residues of a minor amount of at least one hydroxy functional ethylenically unsaturated radically polymerizable monomer, e.g., hydroxypropyl (meth)acrylate, in which case s, p and q are each independently from 3 to 100. The hydroxy functional ethylenically unsaturated radically polymerizable monomer is as described previously herein.

Symbol T of general formulas XII–XVII is or is derived from the radically transferable group of the initiator. For example, when the polymeric flow control agent is prepared in the presence of diethyl-2-bromo-2-methyl malonate, T may be the radically transferable bromo group.

The radically transferable group may optionally be (a) removed or (b) chemically converted to another moiety. In either of (a) or (b), the symbol T is considered herein to be derived from the radically transferable group of the initiator. The radically transferable group may be removed by substitution with a nucleophilic compound, e.g., an alkali metal alkoxylate. However, in the present invention, it is desirable that the method by which the radically transferable group is either removed or chemically converted also be relatively mild.

In an embodiment of the present invention, when the radically transferable group is a halogen, the halogen can be removed by means of a mild dehalogenation reaction. The reaction is typically performed as a post-reaction after the polymer has been formed, and in the presence of at least an ATRP catalyst. Preferably, the dehalogenation post-reaction is performed in the presence of both an ATRP catalyst and its associated ligand.

The mild dehalogenation reaction is performed by contacting the halogen terminated flow control agent of the present invention with one or more ethylenically unsaturated compounds, which are not readily radically polymerizable under at least a portion of the spectrum of conditions under which atom transfer radical polymerizations are performed, hereinafter referred to as "limited radically polymerizable ethylenically unsaturated compounds" (LRPEU compound). As used herein, by "halogen terminated" and similar terms is meant to be inclusive also of pendent halogens, e.g., as would be present in branched, comb and star polymers.

Not intending to be bound by any theory, it is believed, based on the evidence at hand, that the reaction between the halogen terminated polymeric flow control agent and one or more LRPEU compounds results in (1) removal of the terminal halogen group, and (2) the addition of at least one carbon-carbon double bond where the terminal carbon-halogen bond is broken. The dehalogenation reaction is typically conducted at a temperature in the range of 0° C. to 200° C., e.g., from 0° C. to 160° C., a pressure in the range of 0.1 to 100 atmospheres, e.g., from 0.1 to 50 atmospheres. The reaction is also typically performed in less than 24 hours, e.g., between 1 and 8 hours. While the LRPEU compound may be added in less than a stoichiometric amount, it is preferably added in at least a stoichiometric amount relative to the moles of terminal halogen present in the polymeric flow control agent. When added in excess of a stoichiometric amount, the LRPEU compound is typically present in an amount of no greater than 5 mole percent, e.g., 1 to 3 mole percent, in excess of the total moles of terminal halogen.

Limited radically polymerizable ethylenically unsaturated compounds useful for dehalogenating the polymeric flow control agent of the composition of the present invention under mild conditions include those represented by the following general formula XVIII.

XVIII

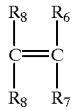

In general formula XVIII, $R_6$ and $R_7$ can be the same or different organic groups such as: alkyl groups having from 1 to 4 carbon atoms; aryl groups; alkoxy groups; ester groups; alkyl sulfur groups; acyloxy groups; and nitrogen-containing alkyl groups where at least one of the $R_6$ and $R_7$ groups is an organo group while the other can be an organo group or hydrogen. For instance when one of $R_6$ or $R_7$ is an alkyl group, the other can be an alkyl, aryl, acyloxy, alkoxy, arenes, sulfur-containing alkyl group, or nitrogen-containing alkyl and/or nitrogen-containing aryl groups. The $R_8$ groups can be the same or different groups selected from hydrogen or lower alkyl selected such that the reaction between the terminal halogen of the polymeric flow control agent and the LRPEU compound is not prevented. Also an $R_8$ group can be joined to the $R_6$ and/or the $R_7$ groups to form a cyclic compound.

It is preferred that the LRPEU compound be free of halogen groups. Examples of suitable LRPEU compounds include, but are not limited to, 1,1-dimethylethylene, 1,1-diphenylethylene, isopropenyl acetate, alpha-methyl styrene, 1,1-dialkoxy olefin and mixtures thereof. Additional examples include dimethyl itaconate and diisobutene (2,4, 4-trimethyl-1-pentene).

For purposes of illustration, the reaction between halogen terminated polymeric flow control agent and LRPEU compound, e.g., alpha-methyl styrene, is summarized in the following general scheme 1.

General Scheme 1

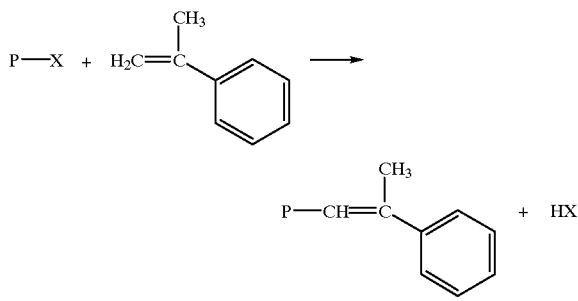

In general scheme 1, P—X represents the halogen terminated polymeric flow control agent.

The thermosetting coating compositions of the present invention may be in the form of liquid coating compositions, e.g., aqueous and solvent based coating compositions and electrodepositable coating compositions, or co-reactable solid particulate compositions, e.g., powder coating compositions. The coating compositions of the present invention may be pigmented or clear, and may be used alone or in combination as primers, basecoats or topcoats.

In a preferred embodiment of the present invention, the coating composition is a co-reactable solid, particulate mixture of (a), (b) and (c). Curable powder coating compositions typically comprise a first reactant having functional groups, e.g., an epoxide functional polymer reactant, and a second reactant that is a crosslinking agent having functional groups that are co-reactive towards and that can form covalent bonds with the functional groups of the first reactant. The first and second reactants of the curable powder coating composition may each independently comprise one or more functional species, and are each present in amounts sufficient to provide cured coatings having a desirable combination of physical properties, e.g., smoothness, clarity, solvent resistance and hardness.

Examples of curable powder coating compositions from which the compositions of the present invention may be selected include, but are not limited to, powder coating compositions comprising epoxide functional polymer as the first reactant and epoxide reactive crosslinking agent, e.g., carboxylic acid functional crosslinking agent, as the second reactant, for example as described in U.S. Pat. Nos. 5,407,707, 5,663,240 and 5,710,214; powder coating compositions comprising carboxylic acid functional polymer as the first reactant and beta-hydroxyalkylamide functional crosslinking agent as the second reactant, for example as described in U.S. Pat. Nos. 4,801,680, 4,889,890, 4,937,288, 5,098,955, 5,202,382 and 5,214,101; and powder coating compositions comprising hydroxy functional polymer as the first reactant and capped isocyanate functional crosslinking agent as the second reactant, for example as described U.S. Pat. No. 4,997,900, 5,439,896, 5,508,337, 5,510,444, 5,554,692, 5,621,064 and 5,777,061.

Polymers comprising the majority of the binder resins in curable powder coating compositions are solid at room temperature, typically having differential scanning calorimetry (DSC) derived glass transition midpoint values of from 30° C. to 80° C., e.g., from 35° C. to 50° C. These polymers also typically have number average molecular weights (Mn) of from 500 to 15,000.

Classes of epoxide functional polymers from which the first reactant of the curable powder coating compositions of the present invention may be selected include, but are not limited to, epoxide functional vinyl polymers, e.g., epoxide functional (meth)acrylic polymers, epoxide functional polyethers, epoxide functional polyesters and combinations thereof. Epoxide functional vinyl polymers can be prepared by free radical polymerization methods that are known to those of ordinary skill in the art. Such known free radical polymerization methods typically make use of suitable initiators, which include organic peroxides and azo type compounds and chain transfer agents, such as alpha-methyl styrene dimer and tertiary dodecyl mercaptan.

Epoxide functional vinyl polymers are typically prepared by polymerizing one or more epoxide functional ethylenically unsaturated monomers, e.g., glycidyl methacrylate, with one or more ethylenically unsaturated monomers that are free of epoxide functionality, e.g., methyl (meth) acrylate, isobornyl (meth)acrylate, butyl (meth)acrylate and styrene. Examples of epoxide functional ethylenically unsaturated monomers that may be used in the preparation of epoxide functional vinyl polymers include, but are not limited to, glycidyl (meth)acrylate, 3,4-epoxycyclohexylmethyl (meth)acrylate, 2-(3,4-epoxycyclohexyl)ethyl (meth)acrylate and allyl glycidyl ether. Examples of ethylenically unsaturated monomers that are free of epoxide functionality include those described in U.S. Pat. No. 5,407,707 at column 2, lines 17 through 56.

In a preferred embodiment of the present invention, the epoxide functional vinyl polymer is prepared from a majority of (meth)acrylate monomers and is referred to herein as an "epoxide functional (meth)acrylic polymer." The epoxide functional vinyl polymer typically has a number average molecular weight of from 500 to 5000, e.g., from 800 to 2500.

Epoxide functional polyethers can be prepared from a hydroxy functional monomer, e.g., a diol, and an epoxide functional monomer, and/or a monomer having both hydroxy and epoxide functionality. Suitable epoxide functional polyethers include, but are not limited to, those based on 4,4'-isopropylidenediphenol (Bisphenol A), a specific example of which is EPON® RESIN 2002 available commercially from Shell Chemicals.

Epoxide functional polyesters can be prepared by art-recognized methods, which typically include first preparing a hydroxy functional polyester that is then reacted with epichlorohydrin. Polyesters having hydroxy functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has hydroxy functionality and the desired molecular weight.

Examples of multifunctional carboxylic acids useful in preparing hydroxy functional polyesters are known to the skilled artisan and include, for example, phthalic acid, tetrahydrophthalic acid, hexahydrophthalic acid, isophthalic acid and terephthalic acid. Examples of polyols useful in preparing hydroxy functional polyesters are known to those skilled in the art and include, for example, glycerin, trimethylolpropane, ethylene glycol and 1,4-dimethylolcyclohexane.

Epoxide reactive crosslinking agents that are used in thermosetting powder coating compositions comprising epoxide functional polymer may have functional groups selected from the group consisting of hydroxyl, thiol, primary amines, secondary amines, carboxyl and mixtures thereof. Useful epoxide reactive crosslinking agents having amine functionality include, for example, dicyandiamide and substituted dicyandiamides. Preferably, the epoxide reactive crosslinking agent has carboxylic acid groups. In one embodiment of the present invention, the epoxide reactive crosslinking agent has carboxylic acid functionality and is substantially crystalline. By "crystalline" is meant that the co-reactant contains at least some crystalline domains, and correspondingly may contain some amorphous domains. While not necessary, it is preferred that the epoxide reactive crosslinking agent have a melt viscosity less than that of the epoxy functional polymer (at the same temperature). As used herein, by "epoxide reactive crosslinking agent" is meant that the epoxide reactive crosslinking agent has at least two functional groups that are reactive with epoxide functionality.

Preferably, the epoxide reactive crosslinking agent is a carboxylic acid functional crosslinking agent, which typically contains from 4 to 20 carbon atoms. Examples of carboxylic acid functional crosslinking agents useful in the present invention include, but are not limited to, dodecanedioic acid, azelaic acid, adipic acid, 1,6-hexanedioic acid, succinic acid, pimelic acid, sebasic acid, maleic acid, citric acid, itaconic acid, aconitic acid and mixtures thereof.

Other suitable carboxylic acid functional crosslinking agents include those represented by the following general formula XIX,

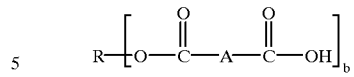

In general formula XIX, R is the residue of a polyol, A is a divalent linking group having from 1 to 10 carbon atoms, and b is an integer of from 2 to 10. Examples of polyols from which R of general formula XIX may be derived include, but are not limited to, ethylene glycol, di(ethylene glycol), trimethylolethane, trimethylolpropane, pentaerythritol, di-trimethylolpropane, di-pentaerythritol and mixtures thereof. Divalent linking groups from which A may be selected include, but are not limited to, methylene, ethylene, propylene, isopropylene, butylene, pentylene, hexylene, heptylene, octylene, nonylene, decylene, cyclohexylene, e.g., 1,2-cyclohexylene, substituted cyclohexylene, e.g., 4-methyl-1,2-cyclohexylene, phenylene, e.g., 1,2-phenylene, and substituted phenylene, e.g., 4-methyl-1,2-phenylene and 4-carboxylic acid-1,2-phenylene. The divalent linking group A is preferably aliphatic.

The crosslinking agent represented by general formula XIX is typically prepared from a polyol and a dibasic acid or cyclic anhydride. For example, trimethylol propane and hexahydro-4-methylphthalic anhydride are reacted together in a molar ratio of 1:3 respectively, to form a carboxylic acid functional crosslinking agent. This particular crosslinking agent can be described with reference to general formula XIX as follows, R is the residue of trimethylol propane, A is the divalent linking group 4-methyl-1,2-cyclohexylene, and b is 3. Carboxylic acid functional crosslinking agents described herein with reference to general formula XIX are meant to include also any unreacted starting materials and/or co-products, e.g., oligomeric species, resulting from their preparation and contained therein.

Curable powder coating compositions comprising epoxide functional polymer and epoxide reactive crosslinking agent usually also include one or more cure catalysts for catalyzing the reaction between the reactive functional groups of the crosslinking agent and the epoxide groups of the polymer. Examples of cure catalysts for use with acid functional crosslinking agents include tertiary amines, e.g., methyl dicocoamine, and tin compounds, e.g., triphenyl tin hydroxide. Curing catalyst is typically present in the curable powder coating composition in an amount of less than 5 percent by weight, e.g., from 0.25 percent by weight to 2.0 percent by weight, based on total resin solids weight of the composition.

Curable powder coating compositions comprising epoxide functional polymer and epoxide reactive crosslinking agent typically have present therein epoxide functional polymer in an amount of from 60 percent to 95 percent by weight, based on total resin solids weight of the composition, e.g., from 70 percent to 85 percent by weight, based on total resin solids weight of the composition. The epoxide reactive crosslinking agent is typically present in the curable powder coating composition in an amount corresponding to the balance of these recited ranges (i.e., 5 to 40, and particularly 15 to 30 percent by weight). The equivalent ratio of epoxide equivalents in the epoxide functional polymer to the equivalents of reactive functional groups in the crosslinking agent is typically from 0.5:1 to 2:1, e.g., from 0.8:1 to 1.5:1. Curable powder coating compositions comprising epoxide functional polymer and carboxylic acid functional crosslinking agent are typically cured at a temperature of from 121° C. to 177° C. over a period of from 10 to 60 minutes.

Curable powder coating compositions comprising carboxylic acid functional polymer as the first reactant (a) and betahydroxyalkylamide functional crosslinking agent as the second reactant (b) are also useful in the present invention. Classes of useful carboxylic acid functional polymers include, but are not limited to, carboxylic acid functional vinyl polymers, carboxylic acid functional polyesters, carboxylic acid functional polyurethanes and mixtures thereof.

Carboxylic acid functional vinyl polymers can be prepared by free radical polymerization methods that are known to those of ordinary skill in the art, for example, free radical polymerization methods as described previously herein. The carboxylic acid functional vinyl polymer is typically prepared by polymerizing one or more carboxylic acid functional ethylenically unsaturated monomers, e.g., (meth) acrylic acid, with one or more ethylenically unsaturated monomers that are free of carboxylic acid functionality, e.g., methyl (meth)acrylate, isobornyl (meth)acrylate, butyl (meth)acrylate and styrene. Alternatively, the carboxylic acid functional vinyl polymer may be prepared by first preparing a hydroxy functional vinyl polymer that is then reacted with a cyclic anhydride, e.g., succinic anhydride. Carboxylic acid functional vinyl, e.g., (meth)acrylic, polymers useful in the present invention are described in further detail in U.S. Pat. No. 4,937,288, column 2, line 1 through column 4, line 17.

Polyesters having carboxylic acid functionality may be prepared by art-recognized methods, which include reacting carboxylic acids (and/or esters thereof) having acid (or ester) functionalities of at least 2, and polyols having hydroxy functionalities of at least 2. As is known to those of ordinary skill in the art, the molar equivalents ratio of carboxylic acid groups to hydroxy groups of the reactants is selected such that the resulting polyester has carboxylic acid functionality and the desired molecular weight. Carboxylic acid functional polyesters useful in the present invention are described in, for example, U.S. Pat. No. 4,937,288, column 4, line 18 through column 6, line 12.

Carboxylic acid functional polyurethanes may be prepared by reacting polyols and polyisocyanates so as to form a polyurethane polyol, which is then reacted with polycarboxylic acid or cyclic anhydride to introduce free carboxylic acid groups into the reaction product. Carboxylic acid functional polyurethanes that may be used in curable powder coating compositions comprising beta-hydroxyalkylamide crosslinking agent are described in further detail in U.S. Pat. No. 4,937,288, at column 6, lines 13 through 39.

One or more beta-hydroxyalkylamide crosslinking agents may be present in the curable powder coating compositions comprising carboxylic acid functional polymer as the first reactant. The beta-hydroxyalkylamide crosslinking agent can be represented by the following general formula XX:

XX

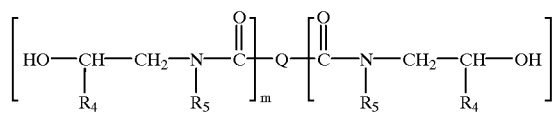

wherein $R_4$ is H or $C_1$–$C_5$ alkyl; $R_5$ is H, $C_1$–$C_5$ alkyl or

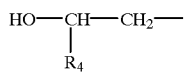

for which $R_4$ is as described above, Q is a chemical bond or monovalent or polyvalent organic radical derived from saturated, unsaturated or aromatic hydrocarbon radicals including substituted hydrocarbon radicals containing from 2 to 20 carbon atoms, m equals 1 or 2, t equals 0 to 2, and m+t is at least 2. Preferably, Q is an alkylene radical —$(CH_2)_x$— where x is equal to 2 to 12, preferably 4 to 10; m is equal to 1 to 2, t is equal to 0 to 2, and m+t is at least 2, preferably greater than 2, usually within the range from greater than 2 up to and including 4. The betahydroxyalkylamide crosslinking agent represented by general formula XX can be prepared by art recognized methods, as described in, for example, U.S. Pat. No. 4,937,288 at column 7, lines 6 through 16.

Curable powder coating compositions comprising carboxylic acid functional polymer and beta-hydroxyalkylamide crosslinking agent typically have present therein carboxylic acid functional polymer in an amount of from 60 percent to 95 percent by weight, based on total resin solids weight of the composition, e.g., from 80 percent to 90 percent by weight, based on total resin solids weight of the composition. The beta-hydroxyakylamide crosslinking agent is typically present in the curable powder coating composition in an amount corresponding to the balance of these recited ranges (i.e., 5 to 40, and particularly 10 to 20 percent by weight).

To achieve a suitable level of cure, the equivalent ratio of hydroxy equivalents in the beta-hydroxyalkylamide crosslinking agent to carboxylic acid equivalents in the carboxylic acid functional polymer is preferably from 0.6:1 to 1.6:1, and more preferably from 0.8:1 to 1.3:1. Ratios outside the range of 0.6:1 to 1.6:1 are generally undesirable due to the resulting poor cure response associated therewith. Curable powder coating compositions comprising carboxylic acid functional polymer and beta-hydroxyalkylamide functional crosslinking agent are typically cured at a temperature of from 149° C. to 204° C. over a period of from 10 to 60 minutes.

Also useful in the present invention are curable powder coating compositions comprising hydroxy functional polymer and capped isocyanate functional crosslinking agent. Hydroxy functional polymers that can be used in such compositions include, but are not limited to, hydroxy functional vinyl polymers, hydroxy functional polyesters, hydroxy functional polyurethanes and mixtures thereof.

Vinyl polymers having hydroxy functionality can be prepared by free radical polymerization methods that are known to those of ordinary skill in the art, for example as described in U.S. Pat. No. 5,508,337, column 3, line 15 through column 5, line 23. In an embodiment of the present invention, the hydroxy functional vinyl polymer is prepared from a majority of (meth)acrylate monomers and is referred to herein as a "hydroxy functional (meth)acrylic polymer."

Hydroxy functional polyesters useful in curable powder coating compositions comprising capped isocyanate functional crosslinking agent can be prepared by art-recognized methods. Typically, diols and dicarboxylic acids or diesters of dicarboxylic acids are reacted in a proportion such that the molar equivalents of hydroxy groups is greater than that of carboxylic acid groups (or esters of carboxylic acid groups) with the concurrent removal of water or alcohols from the reaction medium. Hydroxy functional polyesters useful in the present invention are described in further detail in U.S. Pat. No. 5,508,337 at column 5, line 24 through column 6, line 30.

Hydroxy functional urethanes can be prepared by art-recognized methods, for example, as previously described herein. Hydroxy functional urethanes useful in the present invention are described in further detail in U.S. Pat. No. 5,510,444, at column 5, line 33 through column 7, line 61.

By "capped isocyanate crosslinking agent" is meant a crosslinking agent having two or more capped isocyanate groups that can decap (or deblock) under cure conditions, e.g., at elevated temperature, to form free isocyanate groups and free capping groups. The free isocyanate groups formed by decapping of the crosslinking agent are preferably capable of reacting and forming substantially permanent covalent bonds with the hydroxy groups of hydroxy functional polymer.

It is desirable that the capping group of the capped isocyanate crosslinking agent not adversely affect the curable powder coating composition upon decapping from the isocyanate, i.e., when it becomes a free capping group. For example, it is desirable that the free capping group neither become trapped in the cured film as gas bubbles nor excessively plasticize the cured film. Capping groups useful in the present invention preferably have the characteristics of being nonfugitive or capable of escaping substantially from the forming coating prior to its vitrification.

Classes of capping groups of the capped isocyanate crosslinking agent may be selected from: hydroxy functional compounds, e.g., ethylene glycol butyl ether, phenol and p-hydroxy methylbenzoate; 1H-azoles, e.g., 1H-1,2,4-triazole and 1H-2,5-dimethyl pyrazole; lactams, e.g., e-caprolactam and 2-pyrolidinone; ketoximes, e.g., 2-propanone oxime and 2-butanone oxime and those ketoximes described in U.S. Pat. No. 5,508,337 at column 7, lines 11 through 22, the disclosure of which is incorporated herein by reference. Other suitable capping groups include, morpholine, 3-aminopropyl morpholine and N-hydroxy phthalimide.

The isocyanate or mixture of isocyanates of the capped isocyanate crosslinking agent has two or more isocyanate groups and is preferably solid at room temperature. Examples of suitable isocyanates that may be used to prepare the capped isocyanate crosslinking agent include, monomeric diisocyanates, e.g., α,α'-xylylene diisocyanate, α,αα',α'-tetramethylxylylene diisocyanate and 1-isocyanato-3-isocyanatomethyl-3,5,5-trimethylcyclohexane (isophorone diisocyanate or IPDI), and dimers and trimers of monomeric diisocyanates containing isocyanurate, uretidino, biruet or allophanate linkages, e.g., the trimer of IPDI. Isocyanates that are useful in the present invention are described in further detail in U.S. Pat. No. 5,777,061 at column 3, line 4 through column 4, line 40, the disclosure of which is incorporated herein by reference. A particularly preferred isocyanate is a trimer of 1-isocyanato-3,3,5-trimethyl-5-isocyanatomethylcyclohexane.

The capped isocyanate crosslinking agent may also be selected from oligomeric capped isocyanate functional adducts. As used herein, by "oligomeric capped polyisocyanate functional adduct" is meant a material that is substantially free of polymeric chain extension. Oligomeric capped polyisocyanate functional adducts can be prepared by art-recognized methods from, for example, a compound containing three or more active hydrogen groups, e.g., trimethylolpropane (TMP), and an isocyanate monomer, e.g., 1-isocyanato-3,3,5-trimethyl-5-isocyanatomethylcyclohexane (IPDI), in a molar ratio of 1:3, respectively. In the case of TMP and IPDI, by employing art-recognized starved feed and/or dilute solution synthesis techniques, an oligomeric adduct having an average isocyanate functionality of 3 can be prepared ("TMP-3IPDI"). The three free isocyanate groups per TMP-3IPDI adduct are then capped with a capping group, e.g., 2-propanone oxime or e-caprolactam.

To catalyze the reaction between the isocyanate groups of the capped polyisocyanate crosslinking agent and the hydroxy groups of the hydroxy functional polymer, one or more catalysts are typically present in the powder coating composition in amounts of from, for example, 0.1 to 5 percent by weight, based on total resin solids of the composition. Classes of useful catalysts include, metal compounds, in particular, organic tin compounds, e.g., tin (II) octanoate and dibutyltin(IV) dilaurate, and tertiary amines, e.g., diazabicyclo[2.2.2]octane. Examples of organic tin compounds and tertiary amines are described in U.S. Pat. No. 5,508,337 at column 7, lines 28 through 49, the disclosure of which is incorporated herein by reference.

Curable powder coating compositions comprising hydroxy functional polymer and capped isocyanate functional crosslinking agent, typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the powder composition in an amount corresponding to the balance of these recited ranges (i.e., 5 to 45, and particularly 10 to 25 percent by weight).

The equivalent ratio of isocyanate equivalents in the capped isocyanate crosslinking agent to hydroxy equivalents in the hydroxy functional polymer is typically within the range of 1:3 to 3:1, e.g., 1:2 to 2:1. While equivalent ratios outside of this range can be employed, they are generally less desirable due to performance deficiencies in cured films obtained therefrom. Powder coating compositions comprising hydroxy functional polymer and capped isocyanate functional crosslinking agent are typically cured at a temperature of from 120° C. to 190° C. over a period of from 10 to 60 minutes.

Curable powder coating compositions may optionally contain additives such as waxes to improve the slip properties of the cured coating, degassing additives such as benzoin, adjuvant resin to modify and optimize coating properties, antioxidants and ultraviolet (UV) light absorbers. Examples of useful antioxidants and UV light absorbers include those available commercially from Ciba-Geigy under the trademarks IRGANOX and TINUVIN. These optional additives, when used, are typically present in amounts up to 20 percent by weight, based on total weight of resin solids of the curable composition.

Curable powder coating compositions useful in the present invention are typically prepared by first dry blending the functional polymer, e.g., epoxide functional polymer, the crosslinking agent, the polymeric flow control agent and additives, such as degassing agents and catalysts, in a blender, e.g., a Henshel blade blender. The blender is operated for a period of time sufficient to result in a homogenous dry blend of the materials charged thereto. The homogenous dry blend is then melt blended in an extruder, e.g., a twin screw co-rotating extruder, operated within a temperature range sufficient to melt but not gel the components. For example, when preparing curable powder coating compositions comprising epoxide functional (meth)acrylic polymer and carboxylic acid functional crosslinking agent, the extruder is typically operated within a temperature range of from 80° C. to 140° C., e.g., from 100° C. to 125° C.

Optionally, curable powder coating compositions of the present invention may be melt blended in two or more steps. For example, a first melt blend is prepared in the absence of cure catalyst. A second melt blend is prepared at a lower temperature, from a dry blend of the first melt blend and the cure catalyst. The melt blended curable powder coating composition is typically milled to an average particle size of from, for example, 15 to 30 microns.

In an embodim ent of the present invention, the thermosetting powder coating composition is slurried in a liquid medium such as water, which may be spray applied. Where the language "co-reactable solid, particulate mixture" is used in the s pecification and claims, the thermosetting composition can be in dry powder form or in the form of a slurry.

The present invention is more particularly described in the following examples, which are intended to be illustrative only, since numerous modifications and variations therein will be apparent to t hose skilled in the art. Unless otherwise specified, all parts and percentages are by weight.

Synthesis Examples A–E

Synthesis E xamples A–E describe the preparation o f polymeric flow control agents that are used in the powder coating compositions of Examples 1–5. The flow control agents prepared in Examples A–D are representative of flow modifiers useful in the thermosetting coating compositions of the present invention. The flow control agent of Example E is a comparative flow modifier. In synthesis Examples A–E, the following monomer abbreviations are used: hydroxypropyl methacrylate (HPMA); hydroxyethyl methacrylate (HEMA); iso-butyl methacrylate (IBMA); 2-ethylhexyl methacrylate (2-EHMA); and dimethylaminoethyl methacrylate (DMAEMA). The monomers of synthesis Examples A–E were used as received from the supplier, i.e., they were not further purified prior to use. In the following synthesis examples, percent monomer conversions were determined by measuring (at 110° C./1 hour) the percent weight solids of free monomer present in 0.2 gram samples removed from the reaction vessels, and subtracting this value from 100. The block copolymer structures shown in each of Examples A–D are representative general block copolymer formulas.

EXAMPLE A

A triblock copolymer flow control agent according to the present invention was prepared by controlled radical polymerization from the ingredients as enumerated in the following Table A. The triblock copolymer of this example is summarized as follows:

(IBMA/HPMA)—(2-EHMA/HPMA)—(DMAEMA/HPMA)

TABLE A

| Ingredients | Parts by weight |
|---|---|
| Charge 1 | |
| toluene | 250.0 |
| copper powder (a) | 4.4 |
| 2,2'-bipyridyl | 10.9 |

TABLE A-continued

| Ingredients | Parts by weight |
|---|---|
| p-toluenesulfonyl chloride | 13.3 |
| magnesium silicate (b) | 10.0 |
| Charge 2 | |
| IBMA | 230.0 |
| HPMA | 11.6 |
| Charge 3 | |
| 2-EHMA | 230.0 |
| HPMA | 8.4 |
| Charge 4 | |
| DMAEMA | 40.0 |
| HPMA | 1.62 |
| Charge 5 | |
| toluene | 200.0 |
| Charge 6 | |
| magnesium silicate (b) | 50.0 |

(a) The copper powder had an average particle size of 25 microns, a density of 1 gram/cm$^3$, and was obtained commercially from OMG Americas.
(b) MAGNESOL synthetic magnesium silicate obtained commercially from The Dallas Group of America.

Charge 1 was added to a 2 liter 4-necked flask equipped with a motor driven stainless steel stir blade, water cooled condenser, and a heating mantle and thermometer connected through a temperature feed-back control device. The contents of the flask were heated to and held at 90° C. for one hour, after which Charge 2 was added continuously to the flask over a period of 30 minutes. The contents of the flask were maintained at 90° C. When the monomer conversion of Charge 2 was determined to have reached 99 percent, Charge 3 was added to the flask over a period of 30 minutes. With continued stirring at 90° C. for 4 hours, the monomer conversion of Charge 3 was found to be 99 percent, after which Charge 4 was added over a period of 10 minutes. After an additional 2 hour hold at 90° C., the monomer conversion was determined to be substantially complete. Charges 5 and 6 were added in succession, and the contents of the flask were passed through a filter-press packed with MAGNESOL synthetic magnesium silicate. The filtered resin was then vacuum stripped to a total weight solids of 99 percent (as determined from a 0.2 gram sample at 110° C./1 hour).

The triblock copolymer of Example A was found to have: Mn=10,301; Mn=18,456; z average molecular weight (Mz)=26,922; and a polydispersity index (PDI) (i.e., Mw/Mn)=1.8.

EXAMPLE B

A diblock copolymer flow control agent according to the present invention was prepare d by controlled radical polymerization from the ingredients as enumerated in the following Table B. The diblock copolymer of this example is summarized as follows:

(IBMA/HPMA)—(2-EHMA/HPMA)

TABLE B

| Ingredients | Parts by weight |
|---|---|
| Charge 1 | |
| toluene | 250.0 |
| copper powder (a) | 4.4 |
| 2,2'-bipyridyl | 10.9 |

TABLE B-continued

| Ingredients | Parts by weight |
|---|---|
| p-toluenesulfonyl chloride | 13.3 |
| magnesium silicate (b) | 10.0 |
| Charge 2 | |
| IBMA | 230.0 |
| HPMA | 8.4 |
| Charge 3 | |
| 2-EHMA | 230.0 |
| HPMA | 11.6 |
| Charge 4 | |
| toluene | 400.0 |
| Charge 5 | |
| magnesium silicate (b) | 50.0 |

Charge 1 was added to a flask as described and equipped in Example A. The contents of the flask were maintained at 90° C. throughout the course of the synthetic procedure. one hour after adding Charge 1, Charge 2 was added to the flask over a period of 30 minutes. When the monomer conversion of Charge 2 was determined to have reached 99 percent, Charge 3 was added to the flask over a period of 30 minutes. Six hours after the completion of the addition of Charge 3, the monomer conversion was determined to be substantially complete. Charges 4 and 5 were added in succession, and the contents of the flask were passed through a filter-press packed with MAGNESOL synthetic magnesium silicate. The filtered resin was then vacuum stripped to a total weight solids of 99 percent.

The diblock copolymer of Example B was found to have: Mn=10,661; Mn=16,098; Mz=21,476; and a PDI=1.5.

EXAMPLE C

A diblock copolymer flow control agent according to the present invention was prepared by controlled radical polymerization from the ingredients as enumerated in the following Table C. The diblock copolymer of this example is summarized as follows:

(IBMA)—(2-EHMA)

TABLE C

| Ingredients | Parts by weight |
|---|---|
| Charge 1 | |
| toluene | 250.0 |
| copper powder (a) | 4.2 |
| 2,2'-bipyridyl | 10.4 |
| p-toluenesulfonyl chloride | 12.7 |
| magnesium silicate (b) | 10.0 |
| Charge 2 | |
| IBMA | 230.0 |
| Charge 3 | |
| 2-EHMA | 230.0 |
| Charge 4 | |
| toluene | 400.0 |
| Charge 5 | |
| magnesium silicate (b) | 50.0 |

The diblock copolymer of Example C was prepared in a manner similar to the method as described in Example B. The diblock copolymer of Example C was found to have: a total solids weight of 99 percent; Mn=8,538; Mw=12,809; Mz=17,210; and a PDI=1.5.

EXAMPLE D

A triblock copolymer flow control agent according to the present invention was prepared by controlled radical polymerization from the ingredients as enumerated in the following Table D. The triblock copolymer of this example is summarized as follows:

(2-EHMA/HPMA)—(2-EHMA/HEMA)—(DMAEMA)

TABLE D

| Ingredients | Parts by weight |
|---|---|
| Charge 1 | |
| toluene | 350.0 |
| copper powder (a) | 4.4 |
| 2,2'-bipyridyl | 3.6 |
| p-toluenesulfonyl chloride | 13.3 |
| magnesium silicate (b) | 10.0 |
| Charge 2 | |
| 2-EHMA | 49.5 |
| HPMA | 1.8 |
| Charge 3 | |
| 2-EHMA | 346.5 |
| HEMA | 91.0 |
| 2,2'-diphyridyl | 7.3 |
| Charge 4 | |
| DMAEMA | 45.5 |
| Charge 5 | |
| toluene | 400.0 |
| Charge 6 | |
| magnesium silicate (b) | 50.0 |

Charge 1 was added to a flask as described and equipped in Example A. The contents of the flask were maintained at 90° C. throughout the course of the synthetic procedure. One hour after the addition of Charge 1, Charge 2 was added to the flask over a period of 30 minutes. When the monomer conversion of Charge 2 was determined to have reached 99 percent, Charge 3 was added to the flask over a period of 60 minutes. Four hours after the completion of the addition of Charge 3, the monomer conversion was determined to have reached 98 percent, at which time Charge 4 was added over a period of 30 minutes. Two hours later, the monomer conversion was determined to be substantially complete, and charges 5 and 6 were added to the flask. The contents of the flask were then passed through a filter-press packed with MAGNESOL synthetic magnesium silicate, and the filtered resin was vacuum stripped to a total weight solids of 99 percent.

The triblock copolymer of Example D was found to have: Mn=11,944; Mn=23,140; Mz=32,708; and a PDI=1.8.

EXAMPLE E

A comparative random copolymer flow control agent was prepared by standard, i.e., non-controlled or non-living, radical polymerization from the ingredients as enumerated in the following Table E.

TABLE E

| Ingredients | Parts by weight |
|---|---|
| Charge 1 | |
| toluene | 250.0 |
| Charge 2 | |
| 1,1'-azobis(isobutylnitrile) (c) | 13.5 |
| toluene | 150.0 |
| Charge 3 | |
| IBMA | 230.0 |
| HPMA | 21.6 |
| 2-EHMA | 230.0 |
| DMAEMA | 40.0 |

(c) VAZO 67 free radical initiator obtained commercially from Du Pont Chemicals.

Charge 1 was added to a flask as described and equipped in Example A, and held at 80° C. for 1 hour, after which Charge 2 was added to the flask over a period of 2.5 hours. Ten minutes after the addition of Charge 2 was started, Charge 3 (a homogenous mixture of the listed monomers) was added to the flask over a period of 2 hours. The contents of the flask were maintained at 80° C. over the course of the additions of Charges 2 and 3. With the completion of the addition of Charge 2, the contents of the flask were vacuum stripped to a total weight solids of 99 percent.

The random copolymer of Example E was found to have: Mn15,151; Mn=34,992; Mz=56,473; and a PDI=2.3.

POWER COATING EXAMPLES 1–5

Powder coating Examples 1–4 are representative of thermosetting coating compositions according to the present invention, while powder coating Example 5 is a comparative example. The powder coating compositions were prepared from the ingredients as enumerated in Table 1.

TABLE 1

| Ingredients | Example 1 | Example 2 | Example 3 | Example 4 | Example 5 |
|---|---|---|---|---|---|
| Epoxy functional acrylic (d) | 1037.0 | 1037.0 | 1037.0 | 1037.0 | 1037.0 |
| DDDA (e) | 340.5 | 340.5 | 340.5 | 340.5 | 340.5 |
| Example A flow modifier | 15.0 | 0.0 | 0.0 | 0.0 | 0.0 |
| Example B flow modifier | 0.0 | 15.0 | 0.0 | 0.0 | 0.0 |
| Example C flow modifier | 0.0 | 0.0 | 15.0 | 0.0 | 0.0 |
| Example D flow modifier | 0.0 | 0.0 | 0.0 | 15.0 | 0.0 |
| Example E flow modifier | 0.0 | 0.0 | 0.0 | 0.0 | 15.0 |
| Benzoin | 3.0 | 3.0 | 3.0 | 3.0 | 3.0 |
| Wax (f) | 9.0 | 9.0 | 9.0 | 9.0 | 9.0 |
| UV Stabilizer 1 (g) | 30.0 | 30.0 | 30.0 | 30.0 | 30.0 |
| UV Stabilizer 2 (h) | 30.0 | 30.0 | 30.0 | 30.0 | 30.0 |
| Anti-yellowing additive (i) | 30.0 | 30.0 | 30.0 | 30.0 | 30.0 |
| Amine Catalyst (j) | 5.6 | 5.6 | 5.6 | 5.6 | 5.6 |

(d) A room temperature solid acrylic polymer prepared from (meth) acrylate monomers including glycidyl methacrylate and having an epoxy equivalent weight of 300 grams/equivalent.
(e) dodecanedioic acid.
(f) WAX C MICRO POWDER additive available commercially from Hoechst-Celanese, which describes it as ethylene bis-steroylamide.
(g) TINUVIN 144 ultraviolet light stabilizer available commercially from Ciba-Geigy Corp., which describes it as 2-tert-butyl-2-(4-hydroxy-3,5-di-tert-butylbenzyl) [bis(methyl-2,2,6,6-tetramethyl-4-piperidinyl)] dipropionate.
(h) CGL-1545 ultraviolet light stabilizer available commercially from Ciba-Geigy Corp., which describes it as 2-[4((2-hydroxy-3-(2-ethylhexyloxy)propyl)-oxy]-2-hydroxyphenyl)-4,6-bis(2,4-dimethylphenyl)-1,3,5-triazine.
(i) GCA-1 anti-yellowing agent commercially available from Sanko Chemical Corp.
(j) ARMEEN M2C amine catalyst available commercially from Akzo-Nobel Corp., which describes it as methyl dicocoamine.

The ingredients as enumerated in Table 1 were pre-blended in a Henshel dry blender for 60 to 90 seconds. The pre-blends were then melt-blended in a Werner & Pfleider co-rotating twin screw extruder to form a molten extrudate having a temperature of 100° C. to 125° C. The molten extrudate was pressed into a thin sheet, cooled and solidified on a set of chilled rollers, broken into smaller chips, milled and classified to form thermosetting clear powder coating compositions having an average particle size of from 17 to 27 microns.

Two sets of powder coated panels, having cured film thickness (CFT) of (a) 62–70 microns and (b) 47–55 microns, were prepared by electrostatic spray application of the powder coating compositions of Examples 1–5 over test panel substrates. The powder coating compositions were cured at 145° C. for 30 minutes. The test panel substrates were previously coated with a cured black electrocoat primer available from PPG Industries, Inc. as ED-5051 electroprimer. The appearance of the two sets of powder coated test panels was evaluated, and the results are summarized in Tables 2 and 3.

TABLE 2

Appearance of Powder Coating Examples 1–5
Having Cured Film Thickness of 62–70 microns

| Test | Example 1 | Example 2 | Example 3 | Example 4 | Example 5 |
|---|---|---|---|---|---|
| CFT (k) | 64 | 67 | 70 | 67 | 62 |
| 20° Gloss Value (l) | 83 | 82 | 81 | 84 | 82 |
| Longwave Value (m) | 1.0 | 0.6 | 0.7 | 1.8 | 7.9 |
| Tension Value (n) | 19.3 | 19.8 | 19.2 | 18.3 | 14.6 |

(k) Cured film thickness of the applied powder coating clear coat, in units of microns.
(l) 20° gloss values were obtained using a BYK Gardner Haze-Gloss Meter in accordance with the manufacturer's suggested method of operation.
(m) Longwave values were obtained using a BYK Wavescan Plus instrument in accordance with the manufacturer's suggested method of operation. Longwave values of lesser magnitude are indicative of coatings that are smoother in appearance.

TABLE 2-continued

Appearance of Powder Coating Examples 1–5
Having Cured Film Thickness of 62–70 microns

| Test | Example 1 | Example 2 | Example 3 | Example 4 | Example 5 |
|---|---|---|---|---|---|

(n) Tension values were obtained using a BYK Wavescan Plus instrument in accordance with the manufacturer's suggested method of operation. Tension values of greater magnitude are indicative of coatings that are smoother in appearance.

TABLE 3

Appearance of Powder Coating Examples 1–5
Having Cured Film Thickness of 47–55 microns

| Test | Example 1 | Example 2 | Example 3 | Example 4 | Example 5 |
|---|---|---|---|---|---|
| CFT (k) | 51 | 47 | 55 | 51 | 50 |
| 20° Gloss Value (l) | 83 | 82 | 80 | 83 | 82 |
| Longwave Value (m) | 1.5 | 1.3 | 1.3 | 3.8 | 5.8 |
| Tension Value (n) | 18.7 | 19.0 | 18.9 | 16.6 | 15.6 |

The results as summarized in Tables 2 and 3 show that thermosetting coating compositions according to the present invention, i.e., Examples 1–4, have appearance that is quantitatively better than that of comparative coating compositions, i.e., Example 5. Thermosetting coating compositions according to the present invention, i.e., Examples 1–4, were also found to have appearance that is visually better, e.g., smoother, than that of a comparative composition, i.e., Example 5.

The present invention has been described with reference to specific details of particular embodiments thereof. It is not intended that such details be regarded as limitations upon the scope of the invention except insofar as and to the extent that they are included in the accompanying claims.

We claim:

1. A thermosetting coating composition comprising:
   (a) a first reactant having functional groups;
   (b) a second reactant having functional groups that are co-reactive with the functional groups of said first reactant; and
   (c) a polymeric flow control agent prepared by controlled radical polymerization and comprising,
      (i) a first block containing residues of at least one first ethylenically unsaturated radically polymerizable monomer that is free of hydroxy functionality;
      (ii) a second block containing residues of at least one second ethylenically unsaturated radically polymerizable monomer that is free of hydroxy functionality; wherein said second monomer has a calculated Tg of at least 20° C. greater than the calculated Tg of said first monomer.

2. The composition of claim 1 wherein said first and second blocks of said polymeric flow control agent each independently contain a minor amount of residues of at least one hydroxy functional ethylenically unsaturated radically polymerizable monomer.

3. The composition of claim 1 wherein said polymeric flow control agent has a block containing residues of at least one amine functional ethylenically unsaturated radically polymerizable monomer.

4. The composition of claim 2 wherein said polymeric flow control agent has a block containing residues of at least one amine functional ethylenically unsaturated radically polymerizable monomer, and a minor amount of residues of at least one hydroxy functional ethylenically unsaturated radically polymerizable monomer.

5. The composition of claim 1 wherein said polymeric flow control agent is selected from the group consisting of linear polymers, branched polymers, hyperbranched polymers, star polymers, graft polymers and mixtures thereof.

6. The composition of claim 1 wherein said polymeric flow control agent is prepared by atom transfer radical polymerization initiated in the presence of an initiator having at least one radically transferable group.

7. The composition of claim 6 wherein said polymeric flow control agent contains a residue of said initiator free of said radically transferable group, and a residue of or derived from said radically transferable group, said initiator being selected from the group consisting of linear or branched aliphatic compounds, cycloaliphatic compounds, aromatic compounds, polycyclic aromatic compounds, heterocyclic compounds, sulfonyl compounds, sulfenyl compounds, esters of carboxylic acids, polymeric compounds and mixtures thereof, each having at least one radically transferable halide.

8. The composition of claim 7 wherein said initiator is selected from the group consisting of halomethane, methylenedihalide, haloform, carbon tetrahalide, 1-halo-2,3-epoxypropane, methanesulfonyl halide, p-toluenesulfonyl halide, methanesulfenyl halide, p-toluenesulfenyl halide, 1-phenylethyl halide, $C_1$–$C_6$-alkyl ester of 2-halo-$C_1$–$C_6$-carboxylic acid, p-halomethylstyrene, mono-hexakis(α-halo-$C_1$–$C_6$-alkyl)benzene, diethyl-2-halo-2-methyl malonate and mixtures thereof.

9. The composition of claim 1 wherein said first block is present in an amount of from 5 percent by weight to 95 percent by weight, based on the total weight of said polymeric flow control agent, and said second block is present in an amount of from 5 percent by weight to 95 percent by weight, based on the total weight of said polymeric flow control agent.

10. The composition of claim 1 wherein the weight ratio of said first block to said second block is from 0.05:1 to 19:1.

11. The composition of claim 2 wherein said hydroxy functional monomer is present in said first block in an amount from 1 percent by weight to 20 percent by weight, based on the total weight of said first block, and said hydroxy functional monomer is present in said second block in an amount from 1 percent by weight to 20 percent by weight, based on the total weight of said second block.

12. The composition of claim 1 wherein each of said first and second monomers are independently selected from vinyl monomers, allylic monomers, olefins and mixtures thereof.

13. The composition of claim 12 wherein said first monomer is selected from the group consisting of isobornyl (meth)acrylate, n-butyl methacrylate, iso-butyl methacrylate, ethyl methacrylate and mixtures thereof.

14. The composition of claim 12 wherein said second monomer is selected from the group consisting of iso-decyl (meth)acrylate, lauryl (meth)acrylate, n-octyl (meth) acrylate, 2-ethylhexyl (meth)acrylate, n-butyl acrylate, iso-butyl acrylate, ethyl acrylate and mixtures thereof.

15. The composition of claim 3 wherein said amine functional monomer is selected from the group consisting of di($C_1$–$C_4$ alkyl)aminoethyl (meth)acrylates and mixtures thereof.

16. The composition of claim 2 wherein said hydroxy functional monomer is selected from the group consisting of: hydroxyalkyl (meth)acrylates having from 2 to 20 carbon atoms in the alkyl group; epoxide functional ethylenically unsaturated radically polymerizable monomers, which are hydrolyzed; hydroxyalkyl (meth)acrylates having from 2 to 20 carbon atoms in the alkyl group, which are reacted with a lactone; beta-hydroxy ester functional (meth)acrylates, which are the reaction product of (i) (meth)acrylic acid and a glycidyl ester of a saturated monocarboxylic acid having from 4 to 26 carbon atoms, or (ii) glycidyl (meth)acrylate and a saturated monocarboxylic acid having from 4 to 26 carbon atoms; and mixtures thereof.

17. The composition of claim 16 wherein said hydroxyalkyl (meth)acrylate is selected from the group consisting of hydroxyethyl (meth)acrylate, hydroxypropyl (meth) acrylate, hydroxybutyl (meth)acrylate and mixtures thereof; said epoxide functional monomer is selected from the group consisting of glycidyl (meth)acrylate, 3,4-epoxycyclohexylmethyl (meth)acrylate, 2-(3,4-epoxycyclohexyl)ethyl (meth)acrylate, allyl glycidyl ether and combinations thereof; said lactone is selected from the group consisting of β-propiolactone, β-butyrolactone, γ-butyrolactone, α-methyl-γ-butyrolactone, δ-valerolactone, γ-lactone, γ-caprolactone, ε-caprolactone and mixtures thereof; and said beta-hydroxy ester functional (meth) acrylate is the reaction product of glycidyl (meth)acrylate and isostearic acid.

18. The composition of claim 1 wherein said polymeric flow control agent has a number average molecular weight of from 500 to 100,000.

19. The composition of claim 1 wherein said polymeric flow control agent is present in an amount of from 0.01 percent by weight to 5 percent by weight, based on the total resin solids weight of said composition.

20. The composition of claim 1 wherein the calculated Tg of said second monomer is at least 30° C. greater than the calculated Tg of said first monomer.

21. The composition of claim 1 wherein said coating composition is a co-reactable solid, particulate mixture of (a), (b) and (c).

22. The composition of claim 21 wherein said first reactant is selected from epoxide functional polymers, carboxylic acid functional polymers and hydroxy functional polymers, and said second reactant is a crosslinking agent having functional groups that are co-reactive with the functional groups of said first reactant.

23. The composition of claim 22 wherein said first reactant is selected from carboxylic acid functional polymers, and said second reactant is a beta-hydroxyalkylamide functional crosslinking agent.

24. The composition of claim 22 wherein said first reactant is selected from hydroxy functional polymers, and said second reactant is a capped isocyanate functional crosslinking agent.

25. The composition of claim 22 wherein said first reactant is selected from epoxide functional polymers and said second reactant is a carboxylic acid functional crosslinking agent.

26. The composition of claim 25 wherein said first reactant is an epoxide functional (meth)acrylic polymer, and said carboxylic acid functional crosslinking agent is selected from the group consisting of dodecanedioic acid, azelaic acid, adipic acid, 1,6-hexanedioic acid, succinic acid, pimelic acid, sebasic acid, maleic acid, citric acid, itaconic acid, aconitic acid, carboxylic acid functional crosslinking agents represented by the following general formula,

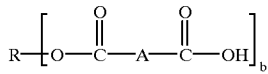

wherein R is the residue of a polyol, A is a divalent linking group having from 2 to 10 carbon atoms, and b is an integer of from 2 to 10, and mixtures of such carboxylic acid functional crosslinking agents.

27. The composition of claim 26 wherein said polyol from which R is derived is selected from the group consisting of ethylene glycol, di(ethylene glycol), trimethylolethane, trimethylolpropane, pentaerythritol, di-trimethylolpropane and di-pentaerythritol; A is selected from the group consisting of 1,2-cyclohexylene and 4-methyl-1,2-cyclohexylene; and b is an integer of from 2 to 6.

28. A thermosetting composition comprising:
(a) a first reactant having functional groups;
(b) a second reactant having functional groups that are co-reactive with the functional groups of said first reactant; and
(c) a polymeric flow control agent prepared by controlled radical polymerization and containing at least one of the following polymer chain structures:

and

wherein M is a residue of at least one first ethylenically unsaturated radically polymerizable monomer that is free of hydroxy functionality; G is a residue of at least one second ethylenically unsaturated radically polymerizable monomer that is free of hydroxy functionality; said second monomer having a calculated Tg of at least 20° C. greater than the calculated Tg of said first monomer; s and p represent average numbers of residues occurring in a block of residues; s and p are each independently from 2 to 100 for each structure.

29. The composition of claim 28 wherein s and p are each independently from 3 to 100, and each of M and G are also independently residues of a minor amount of at least one hydroxy functional ehtylenically unsaturated radically polymerizable monomer.

30. The composition of claim 28 wherein one of said first monomer and said second monomer is selected from at least one amine functional ethylenically unsaturated radically polymerizable monomer.

31. The composition of claim 29 wherein s and p are each independently from 3 to 100, and each of M and G are also independently residues of a minor amount of at least one hydroxy functional ehtylenically unsaturated radically polymerizable monomer.

32. The composition of claim 28 wherein said polymeric flow control agent contains at least one of the following polymer chain structures:

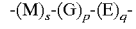

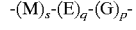

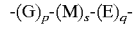

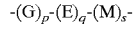

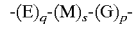

and

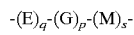

in which E is a residue of at least one amine functional ethylenically unsaturated radically polymerizable monomer; each of M and G are free of residues of amine functional ethylenically unsaturated radically polymerizable monomer; q represents average numbers of residues occurring in a block of residues; and q is independently from 2 to 100 for each structure.

33. The composition of claim 32 wherein said polymeric flow control agent is prepared by atom transfer radical polymerization in the presence of an initiator having a radically transferable group, said polymeric flow control agent having at least one of the following representative polymer chain structures:

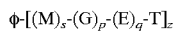

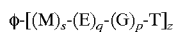

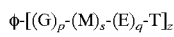

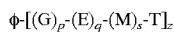

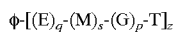

and

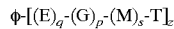

in which φ is or is derived from the residue of said initiator free of said radically transferable group; T is or is derived from said radically transferable group of said initiator; z is independently for each structure at least 1.

34. The composition of claim 33 wherein s, p and q are each independently from 3 to 100 for each structure, and each of M, G and E are also independently residues of a minor amount of at least one hydroxy functional ethylenically unsaturated radically polymerizable monomer.

35. The composition of claim 33 wherein T is halide.

36. The composition of claim 35 wherein T is derived from a dehalogenation post-reaction.

37. The composition of claim 36 wherein said dehalogenation post-reaction comprises contacting said polymeric flow control agent with a limited radically polymerizable ethylenically unsaturated compound.

38. The composition of claim 37 wherein said limited radically polymerizable ethylenically unsaturated compound is selected from the group consisting of 1,1-dimethylethylene, 1,1-diphenylethylene, isopropenyl acetate, alpha-methyl styrene, 1,1-dialkoxy olefin and combinations thereof.

* * * * *